United States Patent [19] [11] 3,810,107
Goldman et al. [45] May 7, 1974

[54] ELECTRONIC TEXT DISPLAY AND PROCESSING SYSTEM

[75] Inventors: Arnold J. Goldman; Stephen L. Kurtin, both of Sherman Oaks; Carver A. Mead, Pasadena, all of Calif.

[73] Assignee: Lexitron Corporation, Chatsworth, Calif.

[22] Filed: Jan. 18, 1973

[21] Appl. No.: 324,776

[52] U.S. Cl. .......... 340/172.5
[51] Int. Cl. .......... G06k 15/02, G06k 15/20
[58] Field of Search .......... 340/172.5

[56] References Cited

UNITED STATES PATENTS

| | | | |
|---|---|---|---|
| 3,648,271 | 3/1972 | McConnell et al. | 340/172.5 |
| 3,706,075 | 12/1972 | Fredrickson et al. | 340/172.5 |
| 3,501,746 | 3/1970 | Vosbury | 340/172.5 |
| 3,454,929 | 7/1969 | Hynes et al. | 340/172.5 |
| 3,610,902 | 10/1971 | Rahenkamp et al. | 340/172.5 |
| 3,540,012 | 11/1970 | Ehrman | 340/172.5 |
| 3,714,636 | 1/1973 | Manly | 340/172.5 |
| 3,618,032 | 11/1971 | Goldsberry et al. | 340/172.5 |

*Primary Examiner*—Paul J. Henon
*Assistant Examiner*—Paul R. Woods

[57] ABSTRACT

An electronic test display and processing system having a display, a memory, and a manually operable data and control function entry device for interactive text processing by an operator via a keyboard whereby text entered on the display is modifiable under the control of the operator. By utilization of a position indicator or cursor which is positionable by the operator on the display screen at the desired position with respect to the text the operator can perform text editing functions such as adding a character, deleting a character, adding or deleting a line of text, selecting a block of text from the display for deletion or insertion into another page of text displayed on the screen, or erasing text.

The text editing functions are accomplished by means of a processor receiving commands indicative of operator action as well as commands indicative of internal signals generated in proper time sequence to perform the functions selected by the operator. The memory includes a display memory capable of storing information in coded form for displaying a full "page" of text; a character buffer for storing information indicative of two characters within a line of text, the two characters being the character currently being displayed as well as the character previously displayed; and a line buffer capable of storing two of the lines of textual information, one line being the line of text currently being displayed while the other line is the line of text previously displayed. Multiplexing and data selection means are provided for sequentially reconfiguring the flow of information through the various storage means within the memory to accomplish the text editing functions.

Figure 1:
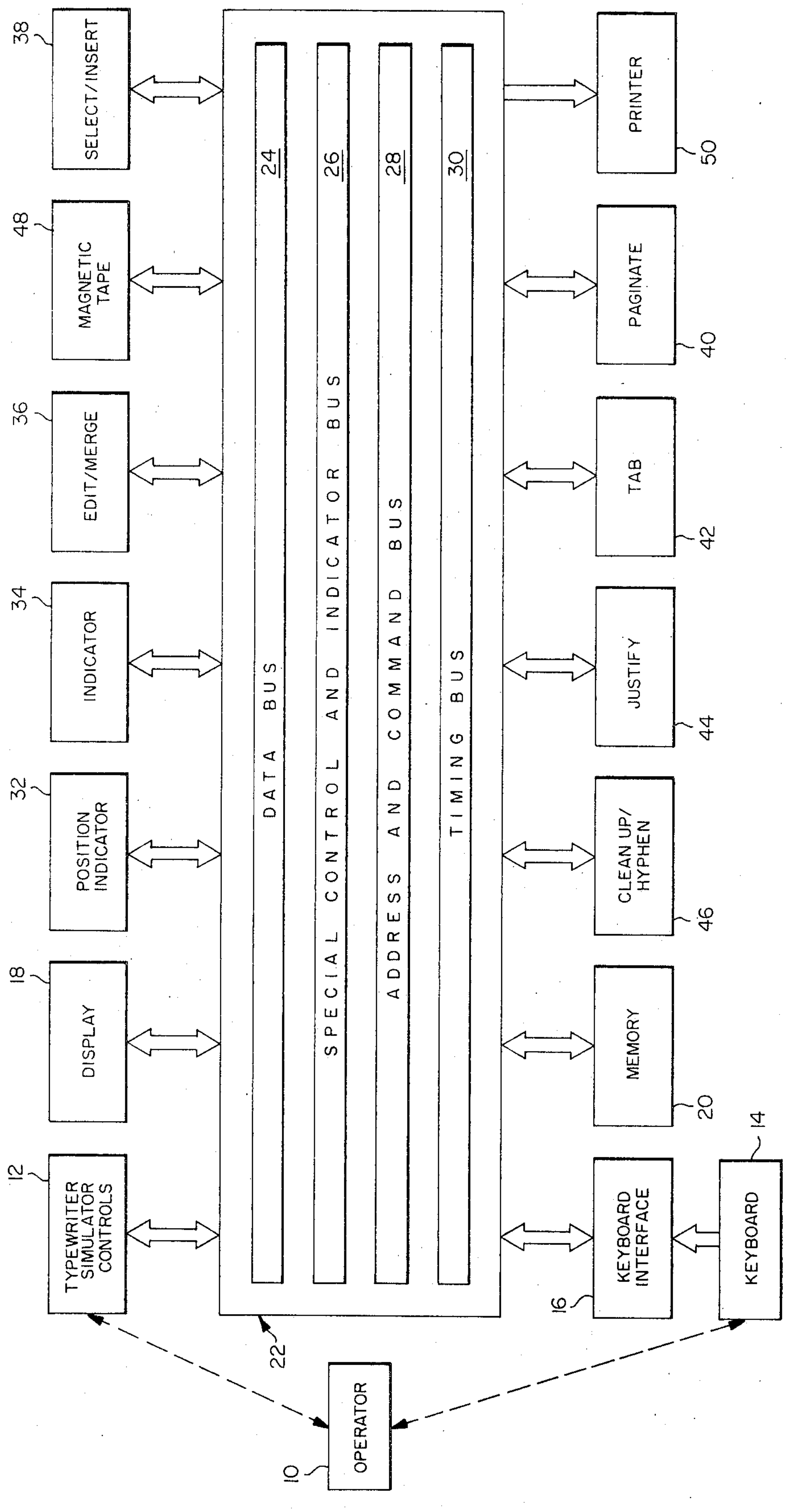
Figure 2:
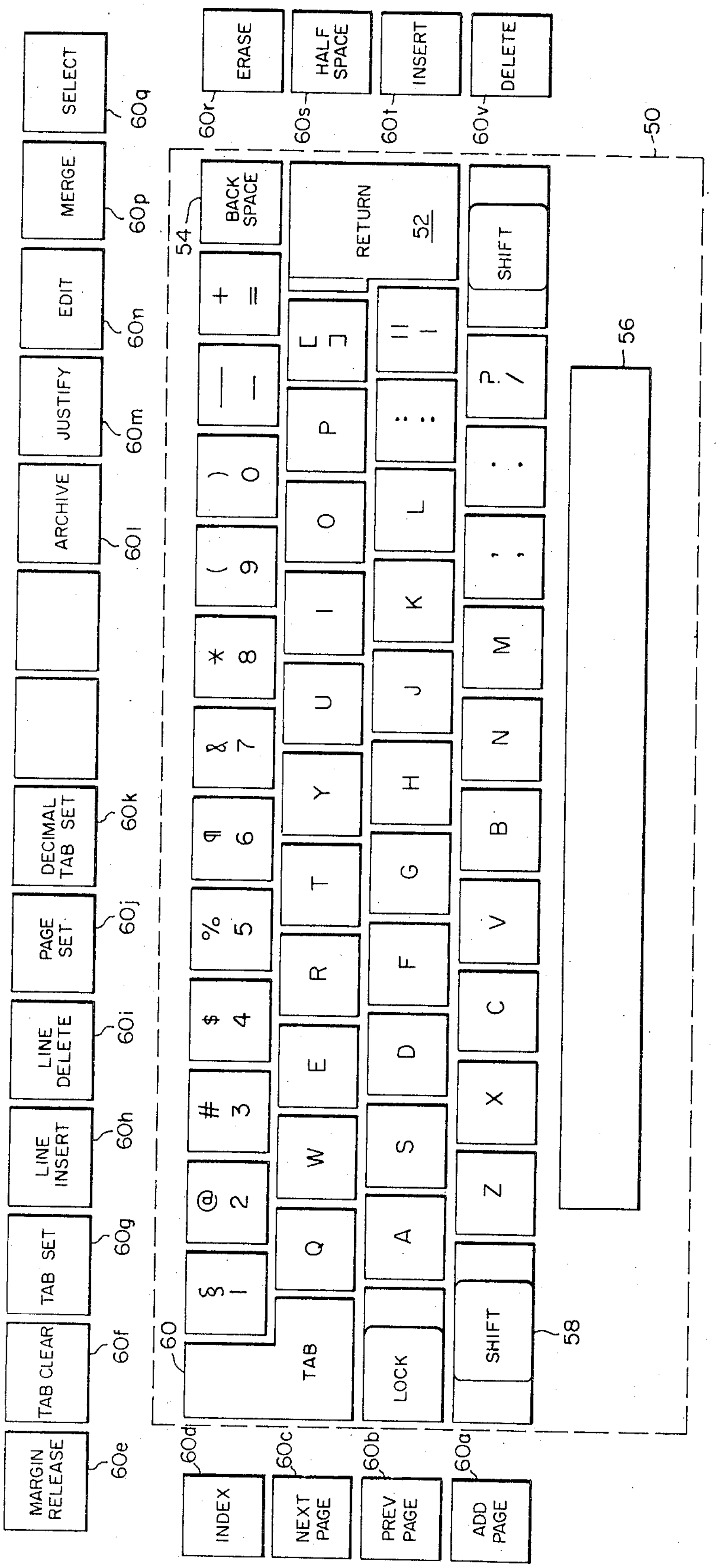

15 Claims, 88 Drawing Figures